United States Patent
Janssen et al.

(10) Patent No.: US 12,517,064 B2
(45) Date of Patent: Jan. 6, 2026

(54) METHOD FOR ASSESSING THE RESULT OF A SURFACE TREATMENT PERFORMED ON A WORKPIECE BY PARTICLE BLASTING

(71) Applicant: 3D.aero GmbH, Hamburg (DE)

(72) Inventors: Anton Janssen, Hamburg (DE); Lars Reimer, Hamburg (DE); Tobias Flüh, Rabenkirchen-Faulück (DE); Tomas Domaschke, Hamburg (DE); Michael Ernst, Sülfeld (DE)

(73) Assignee: 3D.aero GmbH (DE)

( * ) Notice: Subject to any disclaimer, the term of this patent is extended or adjusted under 35 U.S.C. 154(b) by 203 days.

(21) Appl. No.: 18/453,416

(22) Filed: Aug. 22, 2023

(65) Prior Publication Data

US 2024/0068959 A1     Feb. 29, 2024

(30) Foreign Application Priority Data

Aug. 23, 2022   (EP) ..................................... 22191729

(51) Int. Cl.
    *G01N 21/956*     (2006.01)
    *B24C 1/10*     (2006.01)
    *G01N 21/84*     (2006.01)

(52) U.S. Cl.
    CPC ......... *G01N 21/95607* (2013.01); *B24C 1/10* (2013.01); *G01N 2021/8411* (2013.01); *G01N 2021/95615* (2013.01)

(58) Field of Classification Search
    CPC ..... G01N 2035/00881; G01N 21/6428; G01N 2021/6419; G01N 2021/6421; G01N 2021/6441; G01N 15/0205; G01N 15/10; G01N 15/1434; G01N 15/1459; G01N 21/53; G01N 21/538; G01N 2201/061; G01N 2201/062; G01N 2201/0621;
(Continued)

(56) References Cited

U.S. PATENT DOCUMENTS 3,950,642 A    4/1976   Feld
5,235,517 A    8/1993   Thompson
(Continued)

FOREIGN PATENT DOCUMENTS

CN    104736495 A   *   6/2015    ........... C03C 21/002
CN    113795797 A   *   12/2021   ....... G05B 19/41875
(Continued)

*Primary Examiner* — Michael P Stafira
(74) *Attorney, Agent, or Firm* — Sand, Sebolt & Wernow Co., LPA

(57) ABSTRACT

Methods for assessing the result of a surface treatment carried out on a workpiece by particle blasting are disclosed. It is generally common to known automatic methods that they directly determine the covered portion of the surface. Proceeding from the usual definition of the usual 98% degree of coverage as "completely blasted" results in an error in the determination of the corresponding area of 1% to a distortion of the measurement result by 0.98%. In the disclosed method measuring points are identified as not hit by a particle of the particle beam when both a detected surface level is above a level located about a predetermined height threshold value lower than a target level, and a detected gradient falls below a predetermined gradient threshold value.

8 Claims, 5 Drawing Sheets

(58) Field of Classification Search
CPC .............. G01N 2201/0627; G01N 2201/0633; G01N 2201/0696; G01N 2035/0436; G01N 35/026; G01N 1/286; G01N 2035/0425; G01N 33/4833; G01N 1/06; G01N 2001/045; G01N 2001/2886; G01N 33/005; G01N 15/082; G01N 15/1404; G01N 15/1409; G01N 15/1436; G01N 15/1484; G01N 2015/1006; G01N 2015/1493; G01N 2015/1495; G01N 2035/103; G01N 21/47; G01N 21/76; G01N 21/7746; G01N 21/783; G01N 21/91; G01N 31/22; G01N 33/574; G01N 15/0826; G01N 2021/8411; G01N 2021/95615; G01N 21/95607; G01N 27/72; G01N 31/10; G01N 33/0013; G01N 33/5432; G01N 33/582; G01N 1/34; G01N 15/08; G01N 15/0806; G01N 21/552; G01N 27/02; G01N 27/025; G01N 27/90; G01N 27/9046; G01N 3/068; G01N 3/56; G01N 3/58; G01N 33/222; G01N 33/227; G01N 1/32; G01N 13/04; G01N 15/14; G01N 15/1433; G01N 15/1456; G01N 19/04; G01N 2021/8592; G01N 2021/945; G01N 2021/9542; G01N 2021/9546; G01N 21/01; G01N 21/251; G01N 21/27; G01N 21/763; G01N 21/85; G01N 21/94; G01N 21/954; G01N 2203/0005; G01N 2203/0048; G01N 23/225; G01N 23/2255; G01N 2500/10; G01N 27/023; G01N 27/12; G01N 27/80; G01N 27/82; G01N 3/02; G01N 3/04; G01N 3/30; G01N 3/567; G01N 30/02; G01N 30/08; G01N 30/7266; G01N 30/7273; G01N 30/7293; G01N 33/2045; G01N 33/383; G01N 33/48728; G01N 33/5008; G01N 33/54393

See application file for complete search history.

(56) References Cited

U.S. PATENT DOCUMENTS

| | | | |
|---|---|---|---|
| 5,293,320 | A | 3/1994 | Thompson |
| 5,581,483 | A | 12/1996 | Thompson |

FOREIGN PATENT DOCUMENTS

| | | | | |
|---|---|---|---|---|
| DE | 102010001286 A1 | * | 7/2011 | ........... G06T 7/0006 |
| DE | 102015110289 A1 | * | 12/2016 | |
| DE | 102018132945 A1 | * | 6/2020 | |
| DE | 102020108956 A1 | | 9/2021 | |
| DE | 102020108956 B4 | | 8/2022 | |
| EP | 3242125 A1 | * | 11/2017 | ........... G01B 11/303 |
| EP | 3943241 A1 | * | 1/2022 | ............... B24B 1/00 |
| FR | 3100336 A1 | | 3/2021 | |
| JP | 2004142007 A | | 5/2004 | |
| JP | 2010017807 A | | 1/2010 | |
| JP | 20100147807 A | | 1/2010 | |
| JP | 5511407 B2 | | 6/2014 | |
| JP | 2015160282 A | | 9/2015 | |
| WO | WO-2010011578 A2 | * | 1/2010 | ......... G01N 21/9501 |
| WO | 2018185234 | | 10/2018 | |
| WO | 2019159424 A1 | | 8/2019 | |

* cited by examiner

METHOD FOR ASSESSING THE RESULT OF A SURFACE TREATMENT PERFORMED ON A WORKPIECE BY PARTICLE BLASTING

TECHNICAL FIELD

The present invention relates to methods for assessing the result of a surface treatment carried out on a workpiece by particle blasting. This is used, for example, in the aviation and/or automotive industry. In particular, the invention relates to a method for automatically covering particle-blasted, e.g. shot-blasted surfaces.

BACKGROUND ART

In particular in the aviation industry, there are high demands on the reliability and safety of components with low weight at the same time. For this reason, a high portion of the rotating engine components for increasing the fatigue strength is, for example, blasted, in particular shot-blasted. In this case, the surface of the workpiece is bombarded with blasting material, usually balls made of steel, ceramic or glass. The impact of the blasting material leads to a superficial deformation, which leads to the formation of a compressive residual stress state on the workpiece surface. This residual compressive stress state impedes the formation and growth of superficial defects. The increase in fatigue strength thus achieved depends to a large extent on the degree of coverage of the surface. The degree of coverage refers to the portion of the treated surface covered by the impact calotte. Accordingly, the test of particle-blasted surfaces for complete coverage is of particular importance. In practice, this usually refers to a degree of coverage greater than or equal to 98% of particular importance.

The previous established methods are not satisfactory due to their low accuracy, flexibility, robustness, and lack of repeatability.

There are already various approaches in the prior art to determine the quality of a completed particle beam treatment of workpiece surfaces. One of the most widely used methods is still the visual inspection by means of a magnifying glass or a pocket microscope. Typical magnifications lie in the region 10 fold to 30 fold. In such cases, a worker estimates the degree of coverage on the basis of their experience and compared to reference samples.

In a method known from U.S. Pat. No. 3,950,642 A, a fluorescent paint is applied to the surface of a workpiece to be machined prior to the blasting. The paint chips off in locations that are directly hit. After the blasting is completed, the appearance of the workpiece is compared to prepared samples under UV light and a degree of coverage is thus determined.

U.S. Pat. No. 5,293,320 A specifies to create a surface map by means of linear tactile measurement of the surface. In height sections of this surface map, contours are searched and classified, for instance comparable contour lines on maps. The degree of coverage is determined on the basis of the number and type of these contours.

U.S. Pat. No. 5,235,517 A proposes another procedure. According to that, a line is measured tactilely both on the piece to be tested and also on a reference piece. In this case, the waveform and the magnitude of the gradient are determined. Subsequently, the results of the two pieces are compared and a degree of coverage is derived therefrom.

A method disclosed in U.S. Pat. No. 5,581,483 A stipulates a correlation analysis on two ideally parallel line segments of the surface to be tested. High correlation values are due to regular surface geometries such as lathe grooves. Low correlation values indicate random surface geometries, as are caused by the shot blasting, thus showing high degrees of coverage.

DE 102010001286A1 proposes generating a 3 D surface recording by means of white light interferometer or confocal microscope, and then to determine the local heights caused by the radiation by subtraction of the determined component shape from a known surface geometry of the untreated workpiece. Heights that are below the zero line are identified as impacts. The degree of coverage is then determined on the basis of its area share.

In the case of a procedure proposed in FR 3100336 A1, a 3D depth map is created from photographic images of the blasted surface under different lighting directions. Deep regions whose variation is greater than or equal to 10% of the global variation in the image are identified as impact craters.

JP 2010017807 A proposes a determination of the degree of coverage by means of an analysis of the height distribution of the individual points, wherein it is not stated in detail with which measurement instrument this determination is to take place. According to this document, the Gaussian distributions of the heights of blasted and unblasted surfaces have different widths and mean values. The measured height distribution is broken down into these two components and the areas at the surface are determined on the basis of the integrals under the distributions.

In a method according to JP 551140762 and/or JP2015160282 A, images of the surface are first produced with a telecentric objective with spacer. Coaxial illumination is implemented via a beam splitter with an LED mounted orthogonally to the optics axis. The identification of the aggregates is carried out in the method according to the 551140762 over a simple threshold value of the brightness, the area calculation is done by pixel. In the method according to 2015160282 A, the determination of the degree of coverage is completed via the average luminance (as an arithmetic mean of all pixel brightness) and corresponding calibration functions for the respective surface to be radiated.

In a procedure according to WO 2018185234A1, the correlation of degree of coverage to a parameter L* in the CIELAB color space is utilized. A corresponding correlation function is created on the basis of samples of different degree of coverage. This document provides exact information on the creation of the recordings required for performing the method.

In a method according to 2019159424A1, scaling of an image obtained by means of a camera to a standardized size is used, this is done both with regard to the resolution and the average diameter of the aggregates. Subsequently, a color correction, filtering and sharpening can be performed if necessary. The evaluation is carried out by means of a neural network. The classification of coverage takes place in categories of 0% to 98% percent.

DE 102020108956A1 proposes detecting at least one impact geometry in order to calculate at least one quality parameter. The blasting process is to be controlled on the basis of this. The determination system is described as an optical, preferably according to the principle of white light interferometry. The determination system is to be able to communicate with the radiation system control with the aid of a digital computer. Further details on the structure, algorithm, or procedure are not provided.

The known processes include the following disadvantages:

Manual testing methods for the coverage check by means of e.g. a magnifying glass/pocket microscope, but also with fluorescent color, are dependent on individual factors such as experience, daily form, and attention of the worker. Precise and repeatable measurement is not possible. Furthermore, documentation of the surface and the testing process itself is not possible in a satisfactory manner. The use of fluorescent paint also leaves residues on the surface.

Previous methods for automated testing usually use tactile linear measurements or photographic images of the surface. The tactile measurement of the surface is time-consuming and usually takes place on measuring machines with limited measurement space and inflexible positioning of the probe tip. A test of large or irregular shaped parts is thus made more difficult or impossible. Furthermore, an error-free scanning of the very irregular blasted surface is usually not possible with the radius of the measuring tip.

Photographic images usually require strict and complex control of the lighting conditions. Deviations from these conditions and irregularities and contamination on the components to be tested lead to unreliable results.

In this case, it is generally common to the known automatic methods that they directly determine the covered portion of the surface. Proceeding from the usual definition of the usual 98% degree of coverage as "completely blasted" results in an error in the determination of the corresponding area of 1% to a distortion of the measurement result by 0.98%.

Known automated approaches, in particular also those based on machine learning, have problems with a sufficiently fine and accurate classification in the vicinity of complete coverage, their strengths are within the range of low coverage levels.

SUMMARY OF THE INVENTION

This invention is intended to remedy this.

For this purpose, the invention proposes a method for assessing the result of a surface treatment carried out on a workpiece by means of particle blasting, wherein (1) by means of an optical measuring method, the surface machined by means of particle blasting is recorded in a spatially resolved manner and in each case for the spatially resolved measuring points a. a surface level, and b. a value of a local gradient with respect to adjacent measurement points is determined. In a step (2) the detected surface level is compared with a target level expected for the untreated workpiece at the measuring location of the measurement point and a deviation is determined, and either (3a.1) identifying such measurement points for which a. the detected surface level as per (1) a. is above a level located about a predetermined height threshold value lower than the target level, and b. the detected gradient as per (1) b. falls below a predetermined gradient threshold value, as measuring points not hit by a particle of the particle beam. A step (3a.2) includes dividing the number of measuring points identified as not hit by a particle of the particle beam as per (3a.1) by the total number of detected measuring points for determining a portion of the surface that is not covered by the particle beam, and/or (3b) determining the distribution of the deviation and the Weibull distribution parameters thereof, wherein an excessively low hit of the workpiece with the particle blast is assumed when the Weibull parameter is below a value in the range of 2.5 to 3.4, in particular in the range of 2.9 to 3.1, in particular a predetermined value.

Advantageous developments may include that a white light interferometry, laser light section sensors, a stereo chamber system, and/or a shape-by-shading method may be used as the optical measurement method. Additionally, the method may include that the spatially resolved recording of the surface machined by means of particle blasting may be carried out by means of an optical measuring method with the aid of an optical measuring device arranged on a cobot. Furthermore, the method may include that the values for the height threshold value and/or for the gradient threshold value are determined on the basis of an analysis of a reference pattern processed with a specific particle beam with predetermined particles and blast parameters and/or of a simulation model of a machining pattern produced for such a processing operation.

Accordingly, in a method proposed here for assessing the result of a surface treatment carried out on a workpiece by means of particle blasting, the surface machined by means of particle blasting is recorded in a spatially resolved manner by means of an optical measuring method. Ideally, this occurs with a high resolution. In particular, the resolution should be selected such that at least ten pixels in the width and/or length are omitted, better at least twenty. For the smallest particles used in practice, this would mean 7 μm lateral minimum resolution, for the largest particles 0.13 mm. The height resolution should ideally be at least five times, in particular at least ten times, as good as the lateral minimum resolution indicated above, in particular the lateral resolution used. In particular, a lateral resolution of 5 μm or better and/or a height resolution of <1 μm in one or two lateral directions can be used. In particular, the height is recorded in a spatially resolved manner. A surface level and a value of a local gradient with respect to adjacent measuring points are then determined for the measuring points recorded in a spatially resolved manner. A surface level means a spatial position of the surface point in relation to a reference point, for example to a predefined origin point or to an original plane in the workpiece itself. Consequently, the surface level then indicates a value for an elevation of the surface at the location of the respective measuring point.

Furthermore, according to the invention, the detected surface level is compared with a target level expected for the untreated workpiece at the measuring location of the measuring point, and a deviation is determined. The expected target level can be derived, for example, from a construction model of the workpiece, but also from a measurement of the workpiece before the treatment by means of particle radiation.

In a further step, those measuring points for which both the surface level detected according to the invention is above a level located about a predetermined height threshold value lower than the target level, and the detected gradient falls below a predetermined gradient threshold value, are identified as measuring points not hit by a particle of the particle beam.

By dividing the number of measuring points identified as not hit by a particle of the particle beam by the total number of detected measuring points, a portion of the surface that is not hit by the particle beam is determined.

Thus, in the method according to the invention, unlike in the known methods according to the prior art, the area hit by the particle beam is therefore not detected and determined, but rather the untouched area. This results in an error occurring here of 1% in the area determination with an assumed 98% degree of coverage, therefore a detection of a 2% non-coverage as fully blasted detected workpiece only leading to a distortion of the measurement result of 0.02%.

White light interferometry can advantageously be used as an optical measurement method. This measurement method has proven to be particularly robust and not susceptible to faults, in particular with respect to possible scattered light. At the same time, it can nevertheless create high-resolution recordings of the treated surface with good spatial and also height resolution.

Even if the receptacles of the surface can basically be carried out with a hands-free measuring device, it has been found to be particularly expedient if the spatially resolved recording of the surface machined by means of particle blasting is carried out by means of an optical measuring method with the aid of an optical measuring device arranged on an automated traveling unit, in particular a robot, industrial robot and/or cobot (collaboration robot).

Advantageously, the method is carried out for a plurality of sections of the same surface, which are in particular disjoint. In particular, the sections are each recorded in a spatially resolved manner, i.e. in particular the height in the sections is detected in a spatially resolved manner. The sections are in particular rectangular or square. In particular, the sections are arranged on one surface or along a line. In particular, the number of sections is between 10 and 500. In particular, the sections each have a size in the range of 10×10 mm to 100×100 mm. In particular, the sections each have a distance in the region of 1 mm to 100 mm and/or span a distance in the range of 5 mm to 300 mm and/or an area in the region of 10×10 mm to 50×100 mm. In particular, the sections are arranged equidistantly and/or regularly on the line and/or surface. In this way, a particularly representative coverage can be determined with the smallest possible effort.

The evaluation described above is typically carried out in a computer-assisted manner, using a software that performs the evaluation. This can then, in particular, also archive the evaluation results, possibly together with the raw data, for example the surface images, to the workpiece, substantially as a type of quality certificate.

Since the deformation of the surface depends on both the material of the workpiece and the parameters of the particle blasting process, such as in particular the geometric shape and size/size distribution of the particles, the material of which, such as glass, ceramic, steel or the like, as well as the speed of the particle beam, the pulse and energy of the particles when hitting the surface of the workpiece, very different and individual hit patterns and geometries of the blasted workpiece result. As a result, the values for the height threshold value and also for the gradient threshold value must each be determined fora given combination of workpiece and blasting parameters or can be approximately derived from a large database. If the ratio of diameter to depth remains similar to the impact calottes, height threshold values obtained with other parameters and also the gradient threshold values can be used without problems. Advantageously, therefore, a quantity of height threshold values and the gradient threshold values for different ratio of diameter to depth of the impact calottes can be obtained and/or kept available. In particular, for carrying out the method according to the invention, the height threshold value to be applied and the gradient threshold value to be applied are used with the most similar ratio of diameter to depth of the impact calottes or an interpolation or a weighted average value of the height threshold values and the gradient threshold values with the most similar ratios of diameter to depth of the impact calottes.

However, particularly low coverage can also be determined even without height threshold values and also the gradient threshold values. This is because this is possible on the basis of the height distribution itself. Thus, the Weibull distribution parameter can be determined for the height distribution, i.e. the frequency distribution of the determined deviation. In a Weibull distribution parameter, an excessively low degree of coverage can be assumed below an, in particular predetermined, value in the range of 2.5 to 3.4, in particular in the range of 2.9 to 3.1.

For a more accurate determination, the values for the height threshold value and/or for the gradient threshold value can preferably be determined on the basis of an analysis of a reference pattern processed with a specific particle beam with predetermined particles and beam parameters and/or of a simulation model of a processing pattern produced for such a machining process and/or on the basis of analyses of a plurality of reference patterns processed with different particle beams (each with predetermined particles and beam parameters) and/or of simulation models of processing patterns produced for such processing operations.

The threshold values can be determined by means of statistical methods on the basis of the height and gradient distribution in recordings of, but ideally not necessarily scarcely covered, blasted surfaces on reference workpieces. However, it can also be derived from considerations on the basis of considerations of the deformations from a simulation that are to be expected due to impacts and induced compressive residual stresses.

The threshold values (height threshold value and also the gradient threshold value) can be recorded, for example, as coordinates in a two-dimensional parameter space consisting of local height and local gradient, the measured degree of coverage $CR_G(Z,Z')$ being the response variable.

For the determination of threshold values to be specifically used for a plurality of actual coverage levels (e. g. 60%, 80% and 100%) using several samples, the average value of the measured coverage level $CR_{G,i}(Z,Z)$ together with standard deviation $\sigma_i(Z,Z')$ can be determined via the parameter space. The differences of the mean values of the measured degree of coverage between two differently covered sample groups (via the parameter space) are now determined and then normalized with the sum of the respective local standard deviations. The result is a representation of the distinguishing capability $Sig(z,z')$ that can be achieved at different threshold value combinations across the parameter range.

$$Sig(Z, Z') = \frac{CR_{\tilde{G},1}(Z, Z') - CR_{\tilde{G},2}(Z, Z')}{\sigma_1(Z, Z') + \sigma_2(Z, Z')}$$

The result is indicated in the achievable distance of the measured values in standard deviations, with the aid of which optimal threshold value combinations can easily be selected. The relationship between the measured and real degree of coverage can be produced, for example, via a correlation function or look-up table. Alternatively, a separate, in particular predetermined, threshold value between good and bad parts, that is to say those with sufficient and those with insufficient coverage, can be found.

If, for example, the distinction should be between 97% and 98% degree of coverage, it is recommended that samples with appropriate coverage in the area of 97% to 98% to determine the threshold values are used.

The present invention can generally be assigned to the fields of the, in particular automatic, test technology and optical measurement technology for quality assurance. It preferably uses the optical measuring method of white light interferometry for high-resolution planar absorption of particle blasted surfaces. As a result of the preferably employed use of a collaborative robot (cobot) for guiding the optical measuring instrument, such as a white light interferometer, both automatic positioning and measurement and manual guidance are made possible. The obtained surface data are subsequently processed digitally.

In the method according to the invention, a high-resolution measurement instrument guided on a collaborative robot (cobot) can thus be used to generate a high-resolution 3D point cloud of the surface to be tested. Here, as mentioned, preferably a white light interferometer can be used. However, other methods for the purpose of 3D surface treatment are also suitable in principle. To facilitate the fine positioning of the measuring area on the component or workpiece to be tested, a laser targeting apparatus consisting of a cross and a point laser can be used. The lasers can be positioned and aligned on the measuring device in such a way that a tool center point of measuring device marks the center of the cross and the point. Thus, an operator can handle the measuring device particularly easily and align it for the measurement.

For each point of the recorded receptacle, its surface level, i.e. its height, is then determined relative to the idealized workpiece surface, and the local gradient of the surface contour at the point relative to the adjacent points is determined. Points which are at the same time above a height threshold value and below a gradient threshold value are identified according to the invention as part of the original surface that is not covered by the blasting material. The degree of coverage is then deduced on the basis of the uncovered surface portion.

In a method according to the invention, the recordings of the workpiece surface to be examined can, for example, be carried out by a cobot, e.g. the model CRX10IAL-30P-V-PN/0 by the provider FANUC, mounted measuring head of a white light interferometer. The cobot can be arranged, for example, on a movable table. The necessary robot controller can be arranged on the table and a computer for evaluating the receptacles can also be arranged. The upper side of the table can in particular also serve as a storage surface for the components to be tested. In locations with increased cases of occurring vibrations, it may be necessary to mount such a table on dampers. On a flange of the robot, the measuring head can be equipped with a white light interferometer, e.g. the model H6 by the provider Heliotis. The interferometer can optionally be oriented parallel or orthogonally to the axis of rotation of the flange. The measuring head can furthermore contain a cross and a point laser which form a target device. For this purpose, the lasers can be aligned such that the point and the center point of the cross lie on top of one another in the tool center point of the interferometer. The positioning of the measuring head can take place automatically by the robot or using the hand guide function. If an image is now triggered, the data are transmitted to the computer and evaluated.

In order to reduce errors, the interferometer must not exceed a maximum tilting relative to the surface normal of the workpiece during the recording. The maximum allowable tilt depends both on the exact surface geometry and on the required accuracy.

In a pre-processing step, a plurality of individual images can be joined together to form a larger surface. Subsequently, implausible measuring points and noise can be removed via a statistical outlier filter. Here, it is possible to replace missing dots by means of plausible values by means of a modified Gaussian filter. In the point clouds prepared in this way, the theoretical surface of the component can then be determined by means of a fitting algorithm. Alternatively, it is possible to remove the theoretical surface from a construction project for the manufacture of the component. The local heights of the points can now be determined either by calculating the geometric distance from the theoretical surface or by subtracting the Z value of the same at the same X and Y coordinate. The local gradients can now be calculated from the heights determined in this way, for example with a Sobel operator. All points above the height threshold and at the same time below the gradient threshold are identified as part of the uncovered surface.

For determining the threshold values, the following two approaches can be used, for example: the threshold values can be read from the height and gradient histograms of a test measurement. Alternatively, the threshold values can be derived from theoretical considerations on the deformations of the surface to be expected in the specifically used method and the specific workpiece. In the case of read-off threshold values, it is recommended to carry out the test measurement on a sample with a low degree of coverage and then to adapt the threshold values as required in such a way that known completely and incompletely covered test pieces are correctly assigned. In this case, it is important to determine individual threshold values for each combination of material and beam parameters.

BRIEF DESCRIPTION OF THE DRAWINGS

Possible embodiments of the method according to the invention will be explained in the following purely by way of example with reference to the following purely schematic figures. In the drawings.

DETAILED DESCRIPTION

Figure 1:
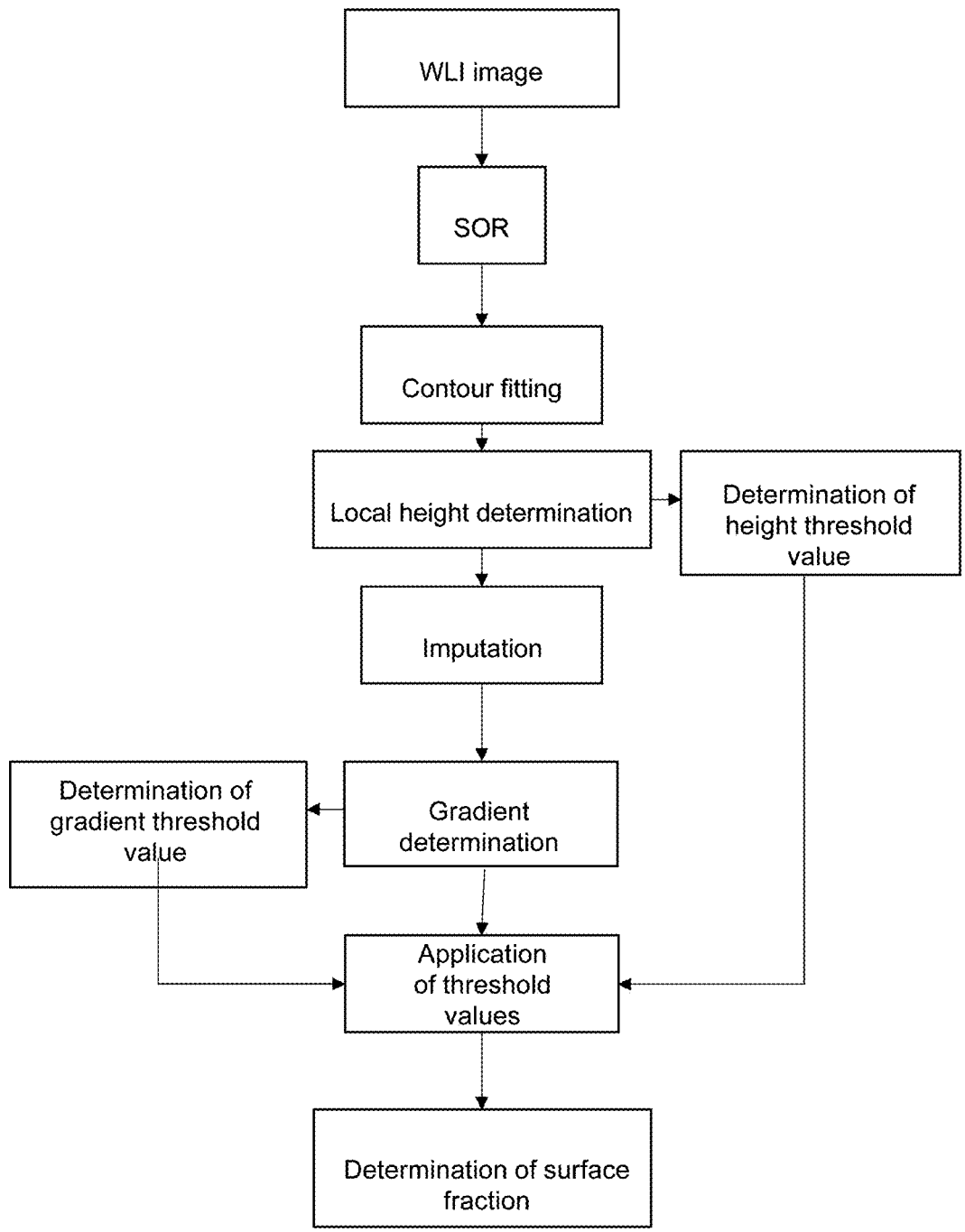
FIG. 1 shows a flowchart.
Figure 2:
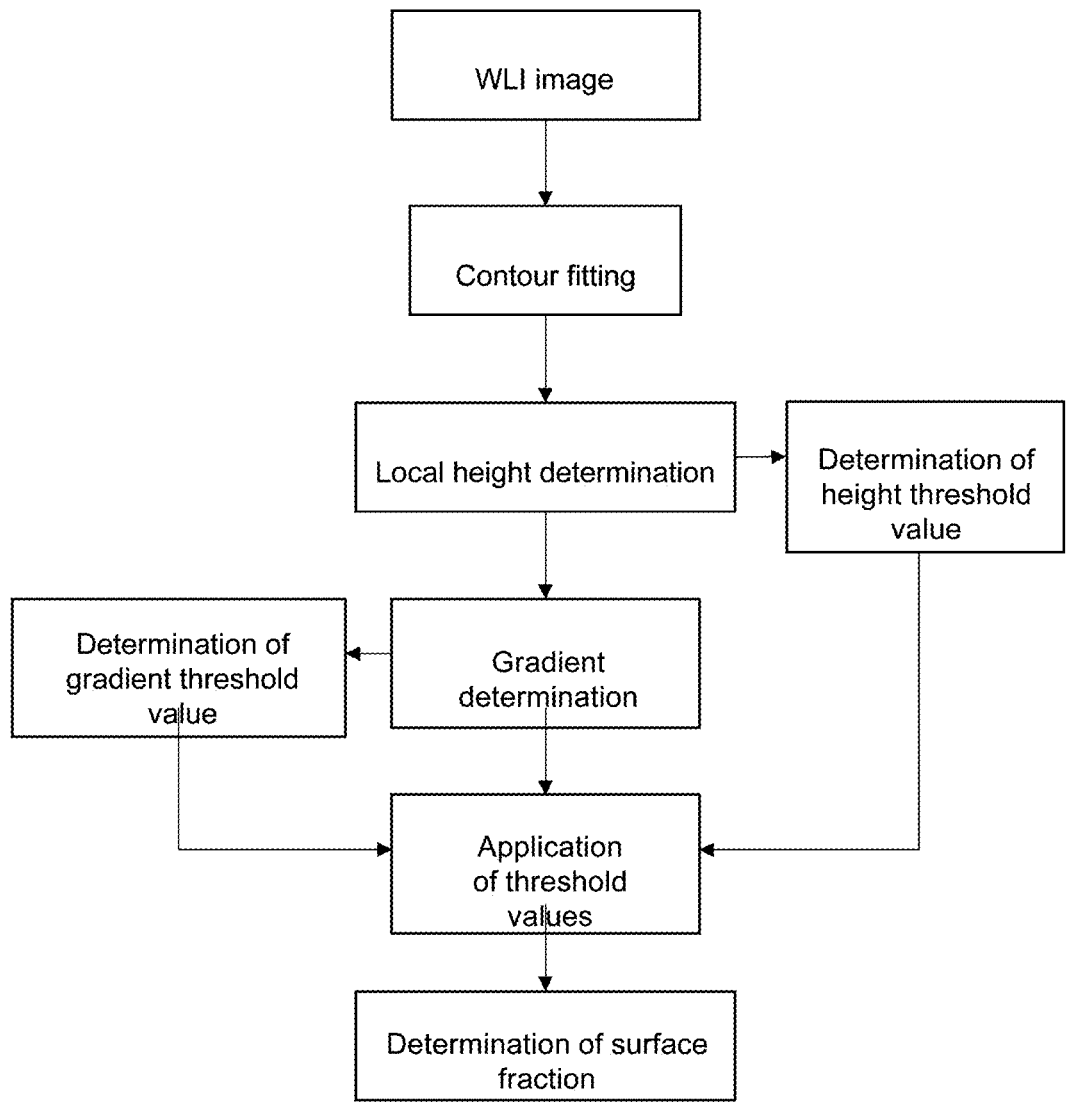
FIG. 2 shows a flowchart.
Figure 3:
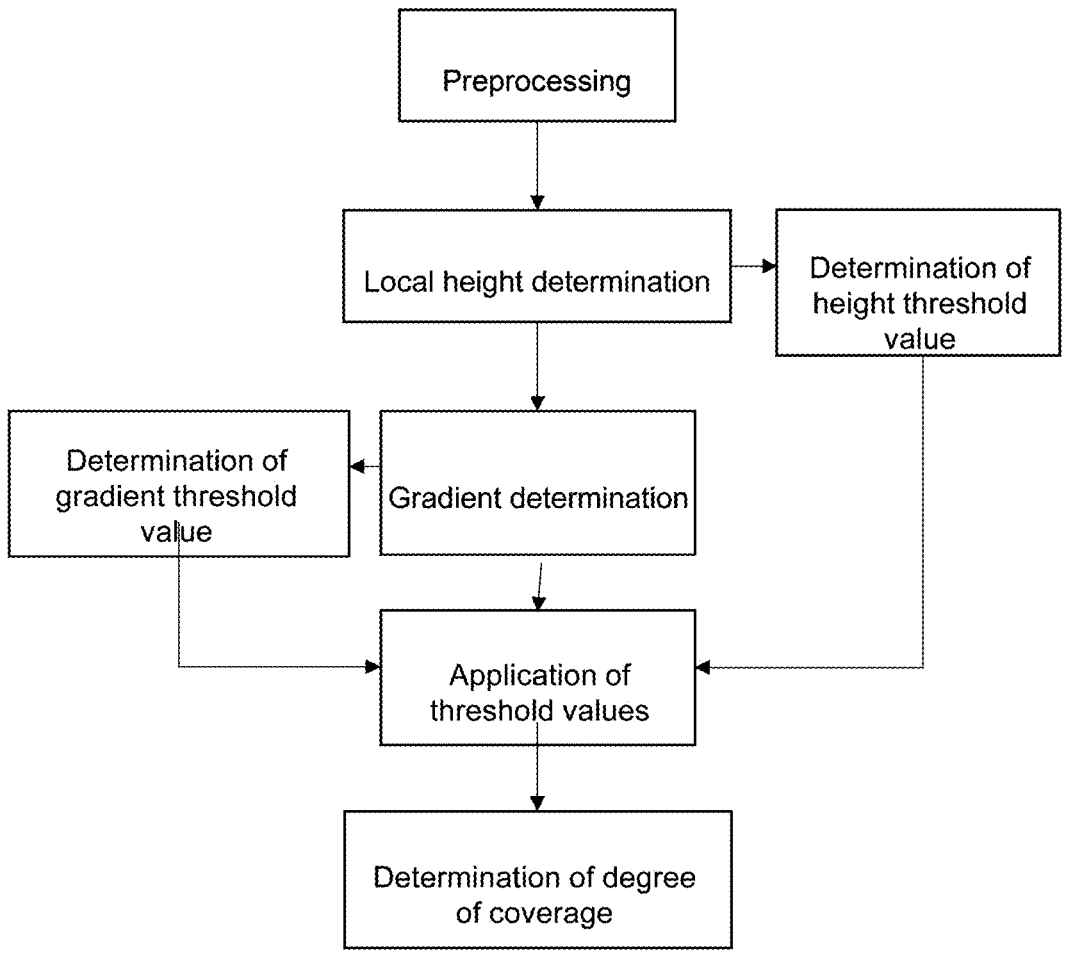
FIG. 3 shows a flowchart.

The FIGS. 1 to 3 show flow diagrams of exemplary embodiments. Around the core of the process regime shown, which starting from the local height determination based on the height threshold value and the gradient determination and the determination of the gradient threshold value, the degree of coverage, that is to say the surface fraction of the original surface, as shown in general in FIG. 3, the FIGS. 1 and 2 show possible further details:

Thus, FIG. 3 initiates with white light interferometry, followed by data processing by SOR (Statistical Outlier Removal) by which outliers are removed on the basis of their too large distance from the neighboring points.

Then follows the fitting with the known target contour (contour fitting) in order to determine the local heights. For the gradient determination, the data set is then completed again by means of importing, in that new measured values are determined for the measuring points that are removed by SOR, for example by interpolation. FIG. 2 shows a simpler process regime without SOR and Imputation.

Figure 4:
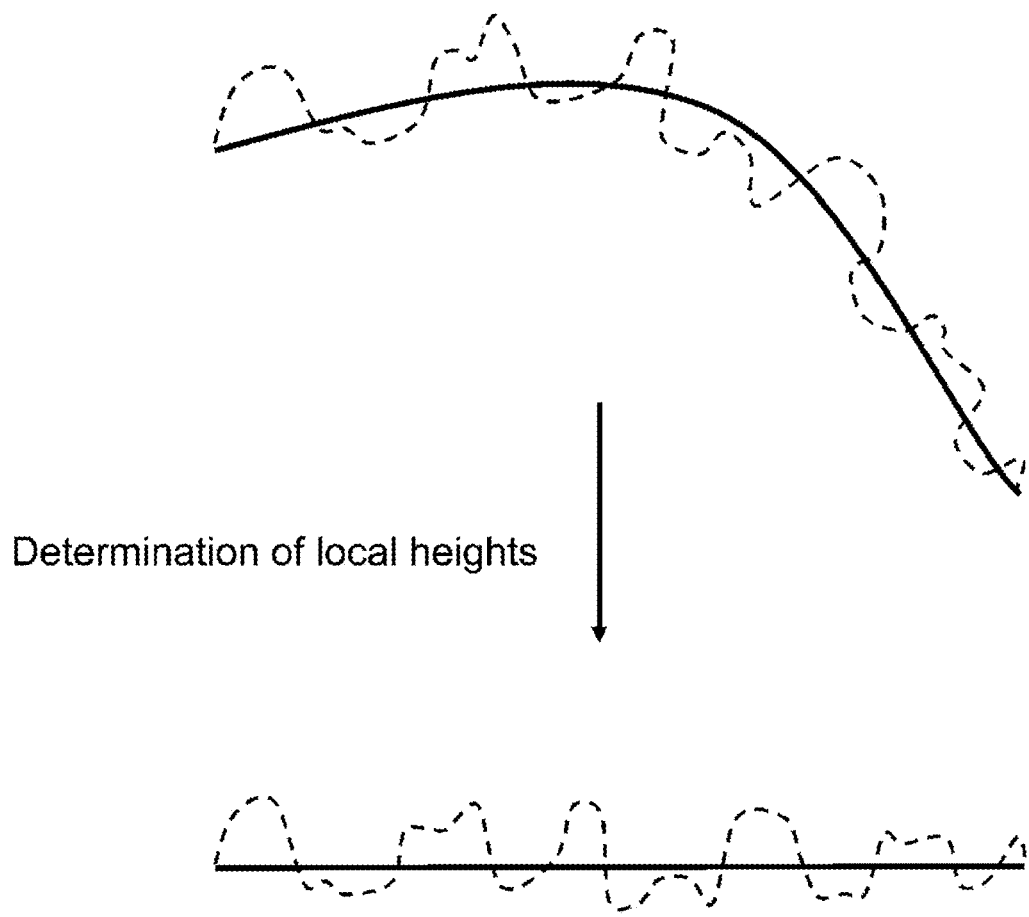
FIG. 4 shows an illustration of the determination of the height deviation.

FIG. 4 schematically illustrates the contour fitting. The measured fine contour is shown as a dashed line. The rough geometry, i.e., for example, the planned contour, is shown with a solid line. The illustration is limited to a two-dimensional section view. By determining the deviation between the fine and coarse contour, the local height can be determined (illustrated by arrow), in which, so to speak, the coarse contour has been bent to a straight line/plane.

Figure 5:
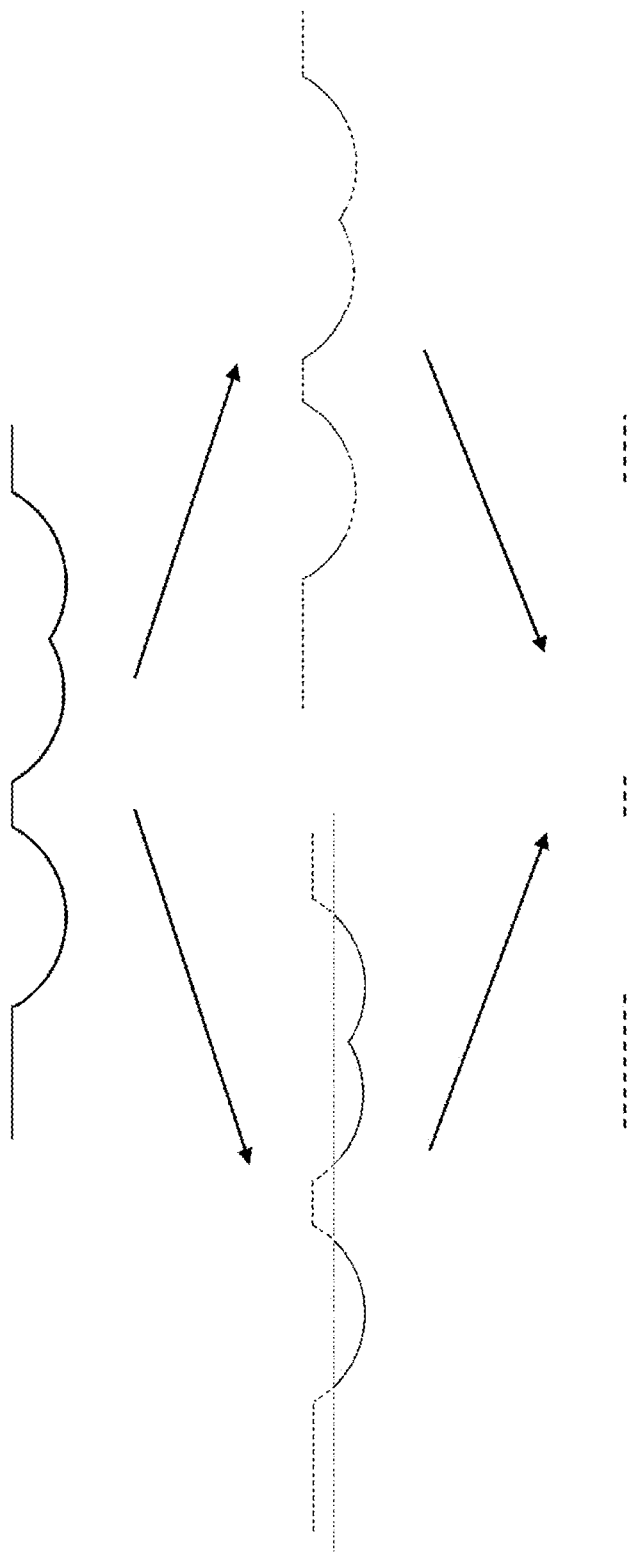
FIG. 5 shows an illustration of the identification of measurement points.

FIG. 5 illustrates the determination of the part not covered by the particle beam. The profile of the local height is shown above a two-dimensional line of intersection. The arrow to the left indicates the determination of the part of the detected surface level, which is above a level located about a predetermined height threshold value lower than the target level, and to the right of the part that falls below a gradient threshold value.

To determine the part of the detected surface level, which is above a level located about a predetermined height threshold value lower than the target level, initially the level is indicated to the left as a dotted line. The part which exceeds the level is a dashed line, the part falling below the level is a solid line.

In order to determine the part that falls below a gradient threshold value, the gradient is determined. The part which falls below the gradient threshold value is shown on the right as a dashed line.

In turn, the part is shown in dashed lines, which is considered to be not affected by the particle blasting on the basis of the two preceding analyses.

In this case, it should be noted that the upper and lower representation are arranged laterally without offset to one another, while the middle representations are shown offset to the left or to the right. It can be seen that, for example, the regions of the start of the craters, even though they still exceed the level, are considered as treated, since there is a large gradient at the start of the crater. On the other hand, the regions of low gradient at the bottom of the craters are also considered to have been treated because they (significantly) fall below the level. This shows that a particularly reliable assessment is possible by the method.

The invention claimed is:

1. A method for assessing a result of a surface treatment carried out on a workpiece by means of particle blasting, wherein the method comprises:
   (1) recording of an optical measuring method a surface machined by means of particle blasting in a spatially resolved manner and, in each case for spatially resolved measuring points, determining:
      a. a surface level, and
      b. a value of a local gradient with respect to adjacent measurement points;
   (2) comparing the determined surface level with a target level expected for an untreated workpiece at a measuring location of a measurement point, and determining a deviation, and either:
   (3a.1) identifying as measuring points not hit by a particle of the particle beam such measurement points for which:
      a. the determined surface level as per (1) a. is above a level located about a predetermined height threshold value lower than the target level, and
      b. the doted determined gradient as per (1) b. falls below a predetermined gradient threshold value;
   (3a.2) determining a portion of the surface that is not covered by the particle beam by dividing the number of measuring points identified as not hit by a particle of the particle beam as per (3a.1) by the total number of determined measuring points, and/or
   (3b) determining a distribution of the deviation and a Weibull distribution parameter thereof, wherein an excessively low hit of the workpiece with the particle beam is assumed when the Weibull parameter is below a predetermined value;
   wherein one of a white light interferometry, laser light section sensors, a stereo chamber system and/or a shape-by-shading method is used as the optical measurement method; and
   wherein the spatially resolved recording of the surface machined by means of particle blasting is carried out with the aid of an optical measuring device.

2. The method according to claim 1, wherein the spatially resolved recording of the surface machined by means of particle blasting is carried out with the aid of the optical measuring device arranged on a cobot.

3. The method according to claim 1, wherein the values for the height threshold value and/or for the gradient threshold value are determined on the basis of an analysis of a reference pattern processed with a specific particle beam with predetermined particles and blast parameters and/or of a simulation model of a machining pattern produced for such a processing operation.

4. The method according to claim 1, wherein the excessively low hit of the workpiece with the particle beam is assumed when the Weibull parameter is below a value in a range of 2.5 to 3.4.

5. The method according to claim 1, wherein the excessively low hit of the workpiece with the particle beam is assumed when the Weibull parameter is below a value in a range of 2.9 to 3.1.

6. The method according to claim 1, wherein the spatially resolved recording of the surface machined by means of particle blasting is carried out with the aid of the optical measuring device arranged on a stand.

7. The method according to claim 1, wherein the spatially resolved recording of the surface machined by means of particle blasting is carried out with the aid of the optical measuring device arranged on a robot.

8. The method according to claim 1, wherein the spatially resolved recording of the surface machined by means of particle blasting is carried out with the aid of optical measuring device having a laser targeting apparatus.

* * * * *